N. A. NEWDICK.

COAL LOADING MACHINE.

APPLICATION FILED JAN. 21, 1922.

Reissued Apr. 18, 1922.

15,339.

5 SHEETS—SHEET 1.

Inventor
Norton A. Newdick
By H. S. McSherry
Attorney

N. A. NEWDICK.

COAL LOADING MACHINE.

APPLICATION FILED JAN. 21, 1922.

Reissued Apr. 18, 1922.

15,339.

5 SHEETS—SHEET 2.

Inventor

Norton A. Newdick

By W. S. McNowell

Attorney

N. A. NEWDICK.

COAL LOADING MACHINE.

APPLICATION FILED JAN. 21, 1922.

Reissued Apr. 18, 1922.

15,339.

5 SHEETS—SHEET 3.

Inventor

Norton A. Newdick

By H. S. McSherrell

Attorney

N. A. NEWDICK.
COAL LOADING MACHINE.
APPLICATION FILED JAN. 21, 1922.
Reissued Apr. 18, 1922. 15,339.
5 SHEETS—SHEET 4.
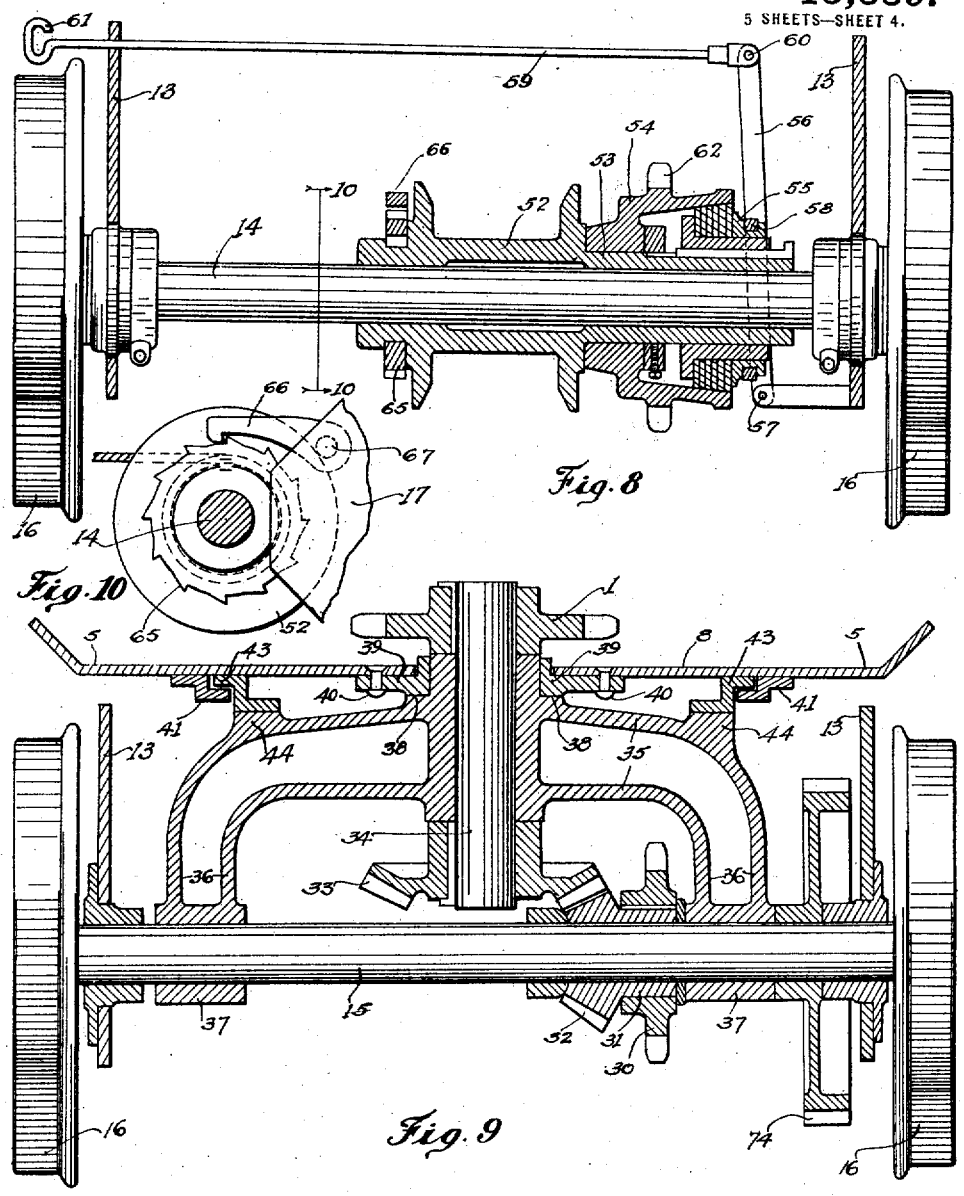
Inventor
Norton A. Newdick
By W. S. McLowell
Attorney

N. A. NEWDICK.

COAL LOADING MACHINE.

APPLICATION FILED JAN. 21, 1922.

Reissued Apr. 18, 1922.

15,339.

5 SHEETS—SHEET 5.

Inventor

Norton A. Newdick

By W. S. McPowell

Attorney

UNITED STATES PATENT OFFICE.

NORTON A. NEWDICK, OF COLUMBUS, OHIO.

COAL-LOADING MACHINE.

15,339. Specification of Reissued Letters Patent. Reissued Apr. 18, 1922.

Original No. 1,362,889, dated December 21, 1920, Serial No. 96,723, filed May 10, 1916. Application for reissue filed January 21, 1922. Serial No. 530,996.

*To all whom it may concern:*

Be it known that I, NORTON A. NEWDICK, a citizen of the United States, residing at Columbus, in the county of Franklin, State of Ohio, have invented certain new and useful Improvements in Coal-Loading Machines, of which the following is a specification.

This invention relates to a material gathering, conveying and car-loading machine primarily adaptable as a transportable mine-working machine for gathering loose or excavated coal and loading it into a mine-car.

The main object of the invention resides in the provision of a machine of this character, which can be readily and conveniently transported within a mine from place to place and in a feeding capacity for progressively advancing the machine to bring its nose or gathering end into and beneath a pile of coal or material to be removed for continuous self-gathering and car-loading operations.

The gathering end of the machine is adapted to sweep or swing sidewise for increasing the gathering range, as from one side of the mine to the other, and for delivering the gathered or collected coal into a mine-car.

The delivery end of the machine is adapted to be centrally disposed over the car for loading to a heaping capacity. To this end, my invention resides broadly in the combination of the two types of conveyers arranged one in advance of the other and constituting a gathering conveyer and a discharging or delivering conveyer. The gathering conveyer is mounted at its rear end to swing about a vertical axis for swinging the forward end laterally and also about a horizontal axis for adjusting the forward end vertically, said conveyer having a pair of parallel corresponding elevating planes over which the flights, carried by a reversible transmission belt, translate, whereby the planes serve alternately for conveying and elevating the gathered material in an advancing or draft direction. The discharging or delivering conveyer has a single plane central of the planes of the gathering conveyer with a hopper at its receiving end open in the line of draft of the conveyer and disposed beneath the discharge end of the gathering conveyer, for receiving the material discharged therein from the gathering conveyer and centralizing the material upon the receiving end of the delivering conveyer which leads out of the hopper and forms the base thereof. The vertical axis of the gathering conveyer and the hopper are located with respect to each other in a connected operative position of the conveyer, so that the hopper will be in a receiving position with relation to the discharge end of the gathering conveyer irrespective of the position of angularity the two conveyers may occupy relatively through the horizontal sweeping adjustment of the forward end of the gathering conveyer.

As herein particularly depicted, the conveyers are mounted upon separate trucks, which are preferably coupled together as a unit, bringing the conveyer into working position and locating the hopper of the delivering conveyer with relation to the vertical axis of the gathering conveyer, so that the hopper will be in a receiving position with relation to the discharge end of the gathering conveyer for all positions of angularity of the gathering conveyer with respect to its truck, and for the positions of angularity of the two trucks with respect to each other, as well as the positions of angularity of the two conveyers within the range of horizontal swinging adjustment of the gathering conveyer, or the positions of angularity the parts may occupy due to the curvature of the track over which the machine is transported.

Among the other objects of my invention is the provision of a structure whereby the gathering conveyer is mounted adjacent its rear end to permit of its various movements and adjustments.

The preferred embodiment of my invention is shown in the accompanying sheets of drawings, in which similar numerals refer to similar parts throughout the several views, and in which:

Fig. 8 is an enlarged section taken on line 8—8, Fig. 4.

Fig. 9 is an enlarged section taken on line 9—9, Fig. 4.

Fig. 10 is a section taken on line 10—10, Fig. 8.

Figures 1, 2:
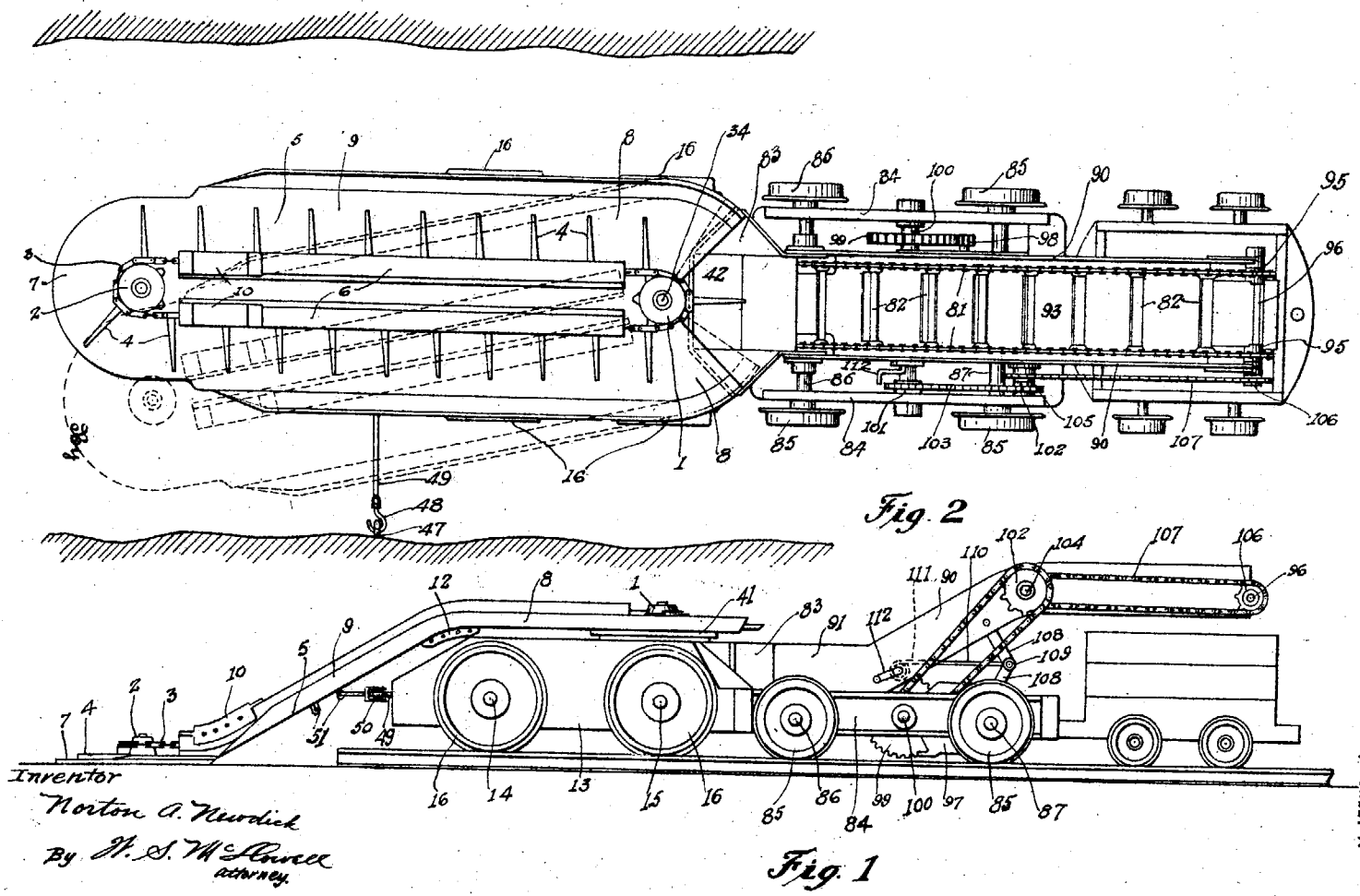
Fig. 1 is a view in side elevation of my improved type of coal loading machine.
Fig. 2 is a top plan view of the structure shown in Fig. 1.

My coal handling apparatus comprises essentially two interacting units shown in assembled relation on Sheet 1 and shown separately on Sheets 2 and 3.

The gathering conveyer and its driving structure is shown in detail on Sheets 2, 4 and 5 and comprises a drive sprocket 1 and an idle or tail sprocket 2, over which an endless chain 3 passes. This chain is equipped with a plurality of laterally extending flights or conveyer arms, shown at 4, which are designed to dig themselves into the coal heap and carry the coal up one side of the conveyer pan or trough, which is designated in its entirety by the reference numeral 5.

The pan or trough provides two parallel horizontal planes or ways or runways over which the flights of the endless chain or transmission belt travel for conveying and elevating the material collected from the forward or nose end of the conveyer to the discharge end thereof. The transmission belt being reversible, adapts the planes to be alternately used for conveying the material in an advancing or draft direction. The gathering conveyer is pivoted at its rear or discharging end and is adapted to be swung sidewise, sweeping the forward or gathering end of the conveyer across the mine floor, increasing its gathering range. The horizontal planes or run-ways of the pan, by reason of their similar construction and interchangeability in operation may be described hereinafter as being of a duplex character.

When the conveyer is swung to the right of its normal straight line position, the transmission belt is operated in a direction, moving the flights in a forward or advancing run over the right plane, and reversely, when the gathering conveyer is swung to the left, utilizing the left plane, or the transmission may be run in any direction as occasion may demand for the most efficient result, and the drive may be reversed to prevent or release choking conditions.

The chain 3, in addition to being guided by the sprockets 1 and 2 is also guided and housed by the channel guideways 6, the conveyer itself being provided with a horizontally extending depressed front end nose portion 7, a rearwardly extending tail portion 8 and an intermediate inclined portion 9. The chain guideways located between the portions 7 and 9 are provided with a curved casting 10 into which a plurality of rollers 11 are rotatably journaled to lessen the amount of friction in causing the chain to pass the angle formed. A similar arrangement is shown at 12 as being located between the portions 9 and 8 of the conveyer frame. It will of course be understood that when the jack post is set up on the other side of the mine room and the conveyer is bodily swung thereby in the opposite direction, the direction of travel of chain 3 is reversed so that the movement of the flights across the nose 7 will be in the direction of bodily movement of the conveyer. It is manifest that this involves merely the reversal of motor 17 in a usual and well known way.

This entire conveyer structure is supported upon a four-wheeled truck comprising the side pieces 13, axles 14 and 15 and the track wheels 16. Between the axles 14 and 15 there is suitably supported a power unit or driving motor 17, on the outer end of the armature shaft of which is mounted a pinion 18. This pinion 18 meshes with a large spur gear 19 rotatably mounted upon a shaft 20, which shaft is shown in detail in Fig. 11. This shaft 20 is also provided with a friction clutch controlling the various movements of the gathering unit and which clutch comprises the slidable member 21 and the stationary member 22. The slidable member is controlled by the lever arm 23 pivotally mounted at 24 upon the motor casing and being pivotally connected at its upper end as is shown at 25 with the control rod 26, which latter passes out through the side frame and is provided at its outer end with an operating handle 27 within the ready grasp of the operator. On the sleeve 28 of the stationary clutch portion 22, I have rigidly secured a sprocket wheel 29 which sprocket is in line with a sprocket 30 rigidly secured to the hub 31 of a bevel gear 32 rotatably supported on the axle 16, this latter structure being shown in detail in Fig. 9. This bevel gear in turn meshes with a bevel pinion 33 located on the vertical shaft 34.

This shaft 34 is rotatably journaled in a yoke member designated 35, which yoke member is provided with depending legs 36 having bearing portions 37 rotatably mounted on the axle 15 as shown more clearly in Fig. 9. The upper end of the shaft 34 carries the drive sprocket 1 and through the drive connections just described, the conveyer as a whole may be set in operation by simply shifting the two clutch parts 21 and 22 in engagement with each other.

Figures 3, 4, 5:
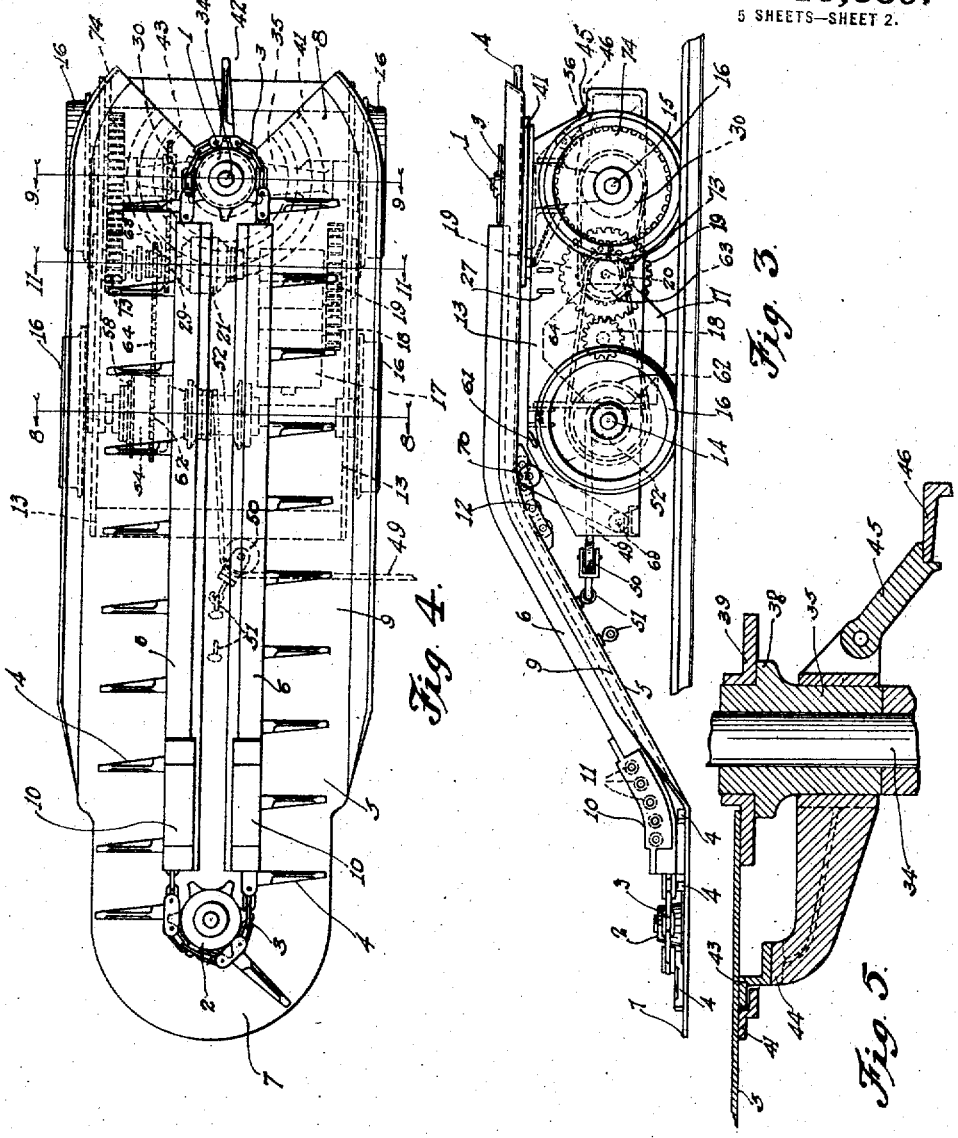
Fig. 3 is a view in side elevation on a slightly larger scale of the gathering conveyer mechanism.
Fig. 4 is a top plan view of the structure shown in Fig. 3.
Fig. 5 is an enlarged detail view showing the manner of supporting the gathering conveyer on its supporting truck.

It is by means of this yoke member, that the conveyer as a whole and the conveyer pan 5 specifically, is mounted to sweep the mine floor, or, in other words, is mounted to swing about a vertical pivot. The upper portion of the yoke member 35 is provided with a neck portion having a shoulder 38 upon which the bearing member 39 rests. The conveyer pan 5 is itself rigidly connected to this bearing member through the medium of the rivets shown at 40 and further, the underside of this pan at this end of the conveyer is provided with an arcuate guide member 41, this guide member being circular with the exception of the open or cut-away portion 42 of the rear end of the pan as is shown in Fig. 4, through which the coal is discharged. This cut-away portion terminates abruptly the rear ends of the conveying planes or ways of the gathering conveyer and provides what may be termed a free or open flight sweep between the flames or ways. A substantially Z-shaped slide member 43 mounted upon bosses 44 of the arms of the yoke member, cooperates with the guide member 41 to give the conveyer pan a substantial bearing at some considerable distance from its rotative center or from the shaft 34. This arrangement just described, permits the conveyer as a whole to sweep the mine floor or pivot about a vertical center which happens to be the shaft 34 and it also permits this conveyer to be swung about a horizontal pivot, which, in this case, is the axle 15. This swinging about the horizontal axis is desirable in that it permits the elevation of the front or nose portion of the conveyer to permit its ready transportation from place to place in the mine. The rear portion of the yoke member 35 is also provided with a pivoted dog 45 which, when the conveyer is in its operative position as is shown in Fig. 3 engages the edge of a bolster 46 forming a portion of the supporting truck.

This arrangement is provided to relieve the yoke member of undue strain as the conveyer is being forced into the coal heap. When the conveyer is forced into the coal heap, the natural tendency would be to cause a pivoting about the axle 15, and, therefore strain the connections between the two members 41 and 43. It is to relieve this strain that the dog 45 is provided, it being, of course, understood that this dog is released when it is desired to elevate the front end of the conveyer.

The mechanism for causing this gathering conveyer to sweep the mine floor will now be described. A jack post or other temporary anchoring means such as shown at 47 is provided and set up adjacent one wall of the mine room or entry. Engaging this jack post is a hook 48 onto which the cable 49 is connected. This cable passes over a pulley 50 secured to the frame portion of the section 9 of the conveyer through the medium of either of the eye bolts 51 and from here it passes rearwardly and is connected with the winding drum 52 mounted on the axle 14 as is shown in Fig. 8. This drum is provided with a laterally projecting sleeve 53 onto which the half 54 of a friction clutch is rotatably mounted. The other half of this clutch is designated 55 and is slidably keyed to the sleeve and is controlled in its movement by means of the arm 56 pivoted at its lower end as is shown at 57 and provided with a shifting yoke 58. To the upper end of this arm the operating rod 59 is pivotally connected as shown at 60 and by operating this rod 59 through the medium of a handle 61 projecting out through the side frame, the friction clutch may be thrown in or out. The portion 54 of this last named friction clutch is provided with a sprocket 62 which sprocket is in line with a sprocket 63 rigidly secured to the shaft 20 on which the main friction clutch is mounted. A chain 64 connects the two sprockets 63 and 62 and, therefore, upon rotation of the shaft 20 this chain 64 is set in operation to rotate the portion 54 of the friction clutch on the shaft 14 and when then the operating handle 61 is grasped to bring the two parts 54 and 55 of the friction clutch on the axle 14 into engagement, the winding drum 52 is also set into operation to wind up the cable 49 and by the shortening of the cable length in this manner, the gathering conveyer as a whole is drawn across the mine floor about its vertical pivot 34. When a sweep across the entire floor has been made, the jack post may be removed and set up on the other side of the mine room, the cable extended and the operation repeated.

In order to automatically prevent the gathering conveyer from forcing itself out of the coal heap after the nose end has been pushed or fed into the same by the operation just described, I have provided one end of the drum with a ratchet face 65, Fig. 10, in connection with which the dog 66 operates. This dog is pivoted as at 67 to the side of the motor frame and as the drum 52 is rotated, the dog runs idle, but upon stopping of the winding action, this dog 66 drops into engagement with one of the teeth on the ratchet wheel 65 and, therefore, prevents reverse rotation of the drum 52. It will be understood that the flights forcing their way into the coal heap have a tendency to push the front end of the conveyer in a direction opposite from that in which it was pulled by the cable and it is, therefore, necessary to lock the conveyer in whatever position of adjustment it may have been placed by the winding up of the cable. This is automatically accomplished by the dog 66 and the ratchet wheel 65. Upon shifting of the jack post and the extending of the cable, it will be understood that the clutch sections 54 and 55 are out of engagement so that the drum is free to rotate on the axle 14. Therefore, by manually releasing the dog 66, the cable may be again extended.

In order to elevate the front end of the gathering conveyer, this same cable and winding mechanism is employed. The hook is disengaged from the jack post and is attached to the arm 68, Fig. 3, which latter is pivoted at its lower end as at 69 to the truck or conveyer support. The upper end of this arm is provided with a roller 70 and the arm is itself slightly longer than the shortest distance between its pivot point 69 and the underside of the conveyer framework. The arrangement is also such that the roller end of this arm 68 operates on the underside of the conveyer framework, as shown in Fig. 3. After the cable hook has been attached to the arm 68, the winding mechanism may be set in operation to shorten the cable length and this action causes the swinging of the arm 68 about its center 69 to elevate the conveyer by swinging it about its horizontal pivot 15. The action of the dog 66 is the same to automatically lock the drum against reverse rotation after the winding operation is stopped and, therefore, the conveyer is held in any position of elevation at the time the driving clutch on the axle 14 is thrown out of engagement.

Figure 11:
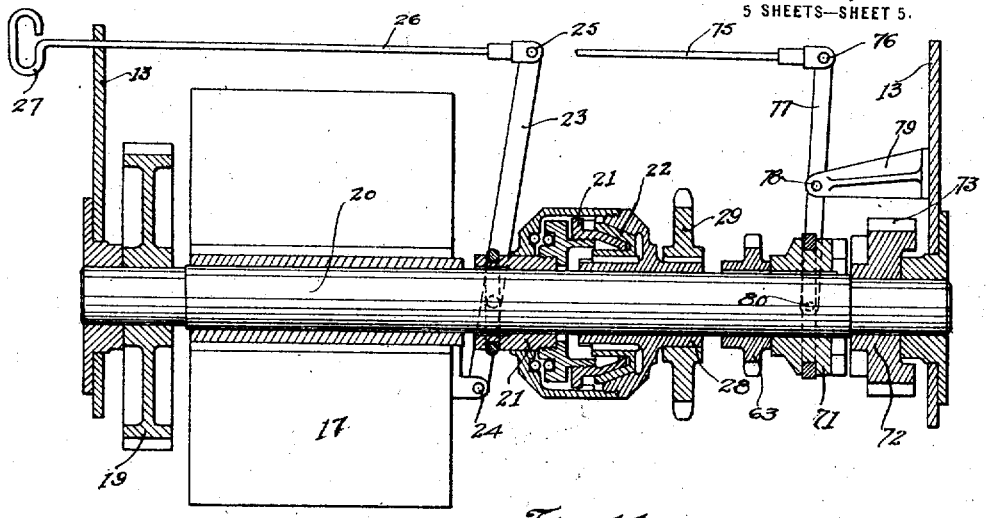
Fig. 11 is an enlarged section taken on line 11—11, Fig. 4.
Figure 12:
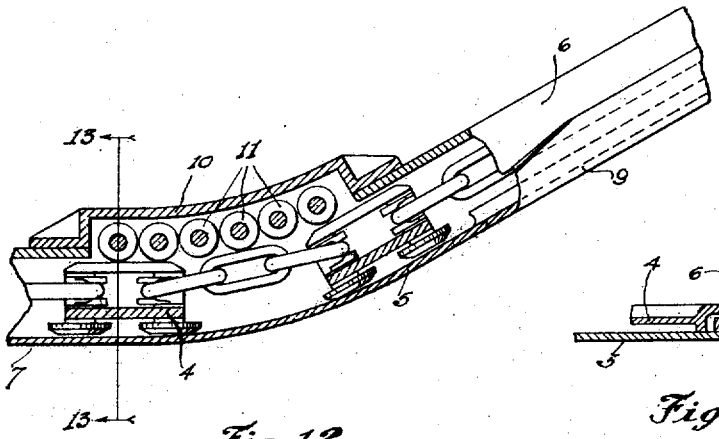
Fig. 12 is an enlarged detail view, partially in section, of a portion of the conveyer chain and its guide.
Figure 13:
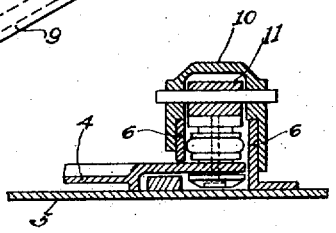
Fig. 13 is a section taken on line 13—13, Fig. 12.

The manner of driving this gathering conveyer upon the mine tracks, will now be described. The main drive shaft 20, as is shown in Fig. 11 is provided with a jaw clutch, the movable section of which is designated by the reference numeral 71 and is rigidly secured to the shaft 20 by means of a sliding key engagement and the other or loosely mounted section of which is designated 72. This section 72 is formed with a spur gear face 73 of a size to mesh with the gear 74 rigidly secured to the axle 15. Therefore, when the friction clutch upon the shaft 20 is thrown in, this shaft is set in operation and by moving the keyed section 71 of the jaw clutch into engagement with the section 72, the two gears 73 and 74 are set into operation, which causes the axle 15 to rotate to in turn rotate the drive wheels 16. The movable section 71 of the jaw clutch is controlled through the medium of the control rod 75 pivoted at one end as shown at 76 to the arm 77. This arm is pivoted intermediate its ends as at 78 to a bracket 79 carried by the truck framework and operatively engages the movable clutch section 71 as is shown at 80.

From the foregoing description, it will be apparent that I have provided a type of gathering mechanism capable of accomplishing all the necessary movements, that of transporting itself about the mine floor, swinging about a vertical pivot to sweep the mine floor, and elevating its front end to clear the track construction to facilitate its more ready transportation.

Figures 6, 7, 14:
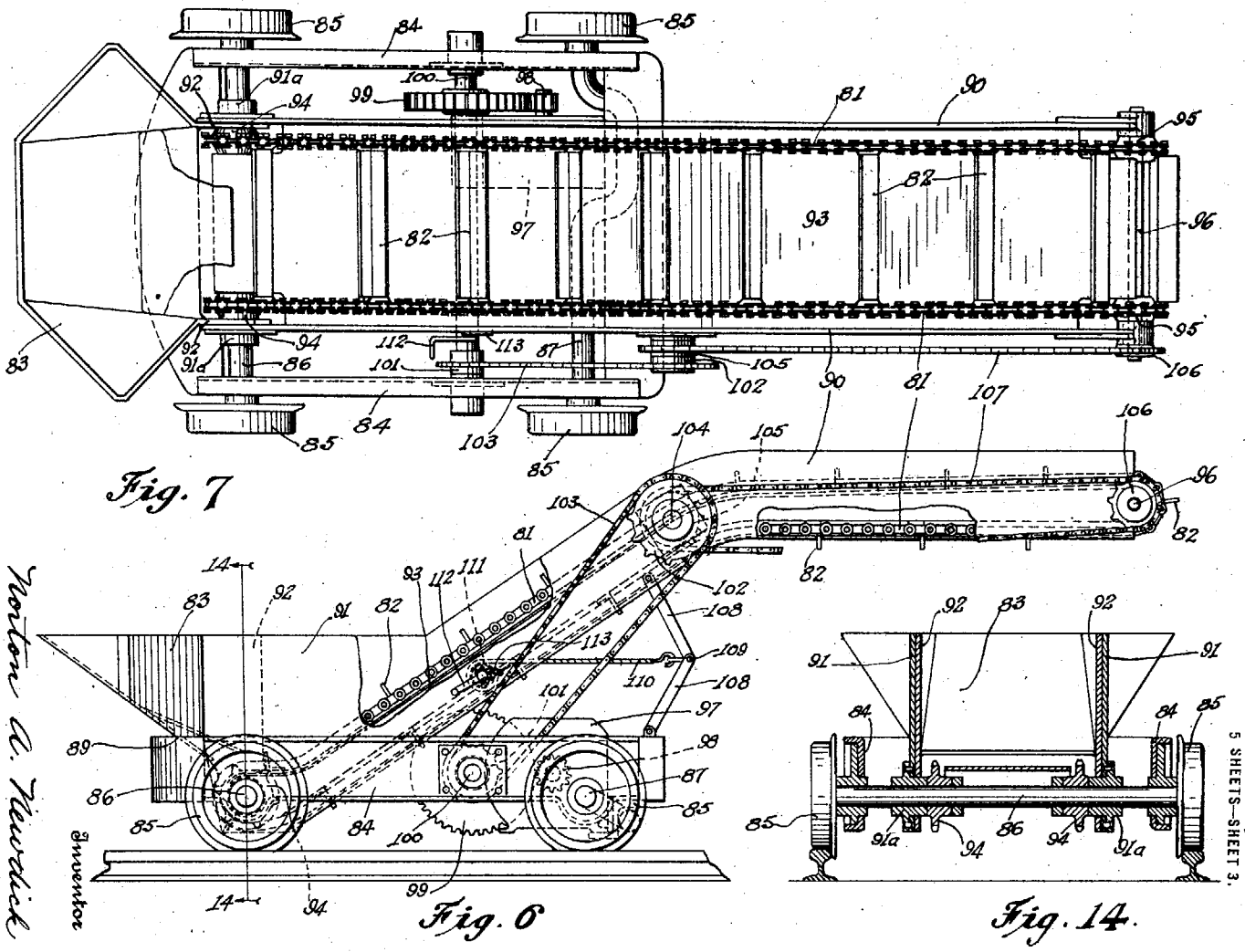
Fig. 6 is a view in side elevation showing the discharge conveyer and its driving mechanism.
Fig. 7 is a top plan view of the structure shown in Fig. 6.
Fig. 14 is a section taken on line 14—14, Fig. 6.

However, the open portion 42 of the conveyer pan changes its position by the sweeping movement of the conveyer and, therefore, the discharge point is not always in central alinement with the conveyer when in the position shown in Fig. 4. This is due to the fact that the center of rotation is about the drive sprocket shaft and, therefore, should a mine car be moved into a position to receive the discharged coal, this coal would only fall into the mine car when the conveyer was in the central position shown in Fig. 4. To overcome this, I have provided the discharging conveyer shown in detail in Figs. 6 and 7. This conveyer comprises a pair of endless chains 81 between which flights 82 are secured and operates out of the base of a hopper 83. This hopper as well as the conveyer and its supporting framework is mounted upon a truck designated generally by the reference numeral 84 and shown as being supported upon four track wheels 85, the latter being mounted upon axles 86 and 87. The hopper proper is mounted to be relatively stationary with the truck frame as is shown in detail in Fig. 14 wherein its sides are shown as being rotatably fitted over collars 91ª to which the sides 91 of the conveyer frame are secured. The sides of the hopper in advance of the collars 91ª are preferably upwardly and outwardly flared to enlarge the entrance of the hopper, increase its holding capacity and maintain its registration with the discharge end of the gathering conveyer during positions of angularity of the two conveyers with respect to each other. The under portion of this hopper further rests on the end frame of the truck as is shown at the point designated 89 and because of its weight, this hopper always maintains this relative position with the frame no matter what may be the position of the conveyer itself. The lower ends of the side frames of this conveyer are rotatably journaled on the axle 86 as is shown and are further provided with upstanding ends 91 to overlap the rearwardly extending portions 92 of the hopper proper. This sliding arrangement between the sides of the hopper and the sides of the conveyer frame is provided to accommodate the structure to the pivotal movement of the conveyer as a whole. The bottom or trough portion shown at 93 which may also be termed a conveying plane or a non-traveling way or run-way cooperates with the flights in moving the coal out of the hopper to its point of discharge and is likewise movable with the conveyer as it swings about its pivot 86 inasmuch as it forms a rigid part of the conveyer frame. The conveyer chains themselves pass over tail sprockets 94 mounted on the axle of the truck 86 and head sprockets 95 loosely mounted on a head shaft 96. The rear portion of the discharge conveyer is so proportioned that it lies substantially parallel with the mine floor when in its operative position as shown in Fig. 6 and extends over the same after the manner illustrated in Fig. 1.

From the arrangement thus far described, it will be apparent that the hopper 83 is so proportioned to receive coal discharged from the gathering conveyer, no matter what may be the position of this conveyer as regards movement about its vertical center. From here the coal is conveyed by means of the discharging conveyer into the mine car and inasmuch as the discharging conveyer never changes its relative position as regards a swinging movement about a vertical pivot, it follows that this conveyer always stands in central alinement with the center of the hopper and is, therefore, always in a proper position to withdraw the coal from the hopper. By means of the rearwardly extending portion as is shown in the drawings, the car may be loaded from its front end and gradually pulled forward by a mine locomotive or any other means as the coal piles up. In addition, the trimmer may pile the coal to a level in the car above or equal to that occupied by the mine car itself as it is pulled forward. It will be observed that the bottom 93 over which the flights 82 travel consists of a plate or plane comprising a sharply inclined portion which constitutes a substantial part of the bottom as well as the rear wall of the hopper proper and that this sharply inclined portion merges into a substantially horizontal portion, which projects rearwardly beyond the truck 84. An important advantage arises from this construction as follows: Frequently very large lumps of coal are discharged into the hopper. If these lumps become securely engaged with the flights they are carried up the sharply inclined portion or rear wall and out of the hopper. If insecurely engaged with a flight they fall back into the hopper. Thus the provision of the sharply inclined portion in conjunction with traveling transverse flights, the whole associated with a hopper one wall of which is formed by said sharply inclined portion assures that no huge lumps will leave the hopper until they become sufficiently engaged by a flight, it being manifest that if such engagement is firm and secure enough to cause the lump to be lifted against the force of gravity from the hopper it will be secure enough to insure the proper conduct of the lump to the discharge end of the conveyer. The importance of this will be appreciated when it is understood that throughout the operation of the machine miners are working about it. A large lump of coal toppled over the side of the discharging conveyer because of its insecure engagement with a flight would be likely to kill or injure a workman.

The manner of driving this discharging conveyer is as follows: A motor 97 is suitably supported on the truck and is provided with a drive pinion 98 meshing with a drive gear 99 mounted on a shaft 100 rotatably journaled in the truck frame. This shaft is also provided with a sprocket 101 in alinement with a sprocket 102 over both of which a chain 103 passes. The sprocket 102 is mounted on a shaft 104 and carries a second sprocket 105 in alinement with a sprocket 106 carried by the head shaft 96 over which the driving chain 107 passes. Thus, when the motor is set in operation, the conveyer as a whole, is driven by the driving arrangement just described.

When transferring the conveyer from place to place about the mine, it is desirable to lower the upper portion in order to give more clearance or head room and inasmuch as this conveyer frame is pivotally mounted about the axle 86, this may be done in the following manner. A pair of toggle links 108 are pivoted respectively to the truck frame and the conveyer support and hingedly connected together as shown at 109. At this connection 109, I have attached a chain 110 which is designed to be wound on a drum 111 which may be hand operated by means of the crank 112. This crank is held against reverse motion by means of the pivoted dog 113. The chain 103 passing over sprockets 101 and 102 is of such length that it attains its proper tautness when the upper portion of the conveyer is substantially parallel with the mine floor and the slack which occurs when the conveyer is lowered is of no consequence, inasmuch as the conveyer is not driven when in such lowered position.

From the foregoing description, taken in connection with the accompanying sheets of drawings, it will be apparent that I have provided a type of coal handling machine which is particularly adapted for many types of mines. The machine operates in a minimum of head room and by means of the rearwardly extending portion of the discharging conveyer, this conveyer may be on a level practically with the level of the mine car, reliance being had on the attendant or trimmer for suitably piling the coal after the car has been gradually pulled forward. Also, this arrangement permits the switching of a loaded car and the bringing of an empty without stopping the operation of the gathering conveyer, the coal gathered in the meantime being deposited in the hopper 83 and when the empty car is brought to position, the discharging hopper may again be set in operation. All the various advantages outlined and those which must be apparent are attributable in a large sense to the particular relationship which must necessarily be established between the vertical swinging axis of the gathering conveyer with respect to the hopper for all of the various relative positions of the two units with respect to each other so that the discharge end of the gathering conveyer will always be in its proper discharging position with respect to the hopper.

The essential character of the machine is the combination of the two different types of conveyers progressively arranged, and an intervening hopper, mobile as a unit for feeding and transporting facilities, each possessing an individual capacity for a particular duty and combining to produce a practical and successful machine for collecting, conveying, elevating and loading material into cars, and operable within diminutive quarters under unfavorable transportation facilities, as in coal mines. The gathering conveyer, for coal mine use, must possess a capacity for continuously handling all grades of material, as slack and lump coal contained in a loose or excavated mass, and have a lateral reach or sweep for gathering the coal of an appropriate gangway, room or stall width, for a direct advance of the machine over track rails; in train line connection with the track over which the coal cars are transported, as a continuation thereof. Track sections are installed with the working advance of the machine. It would be detrimental to the capacity and continuous operation of the machine in resorting to a sidewise shifting of the track or machine for sidewise range requirements of the gathering conveyer. This will be appreciated for either solid or loose coal mining conditions. Under solid coal mining conditions, the removal of the excavated coal is periodical or in charges, this being necessitated on account of the preparation for penetrating the mine breast in limited degrees, as drilling, boring and blasting, and the removal of the overhanging slate or like partially loose waste strata, and shoring. This preliminary work requires head or working room and clear transportation facilities for transporting the machines used for such preparatory work, and the gathering and loading machine is therefore removed and usually is transported to another breast location.

For loose coal mining, as removing pillars in which the coal has been loosened by the weight upon the pillars, the removal must be quick and progressive, especially in removing the last pillar stump, to eliminate any or undue shoring of the mine roof before it caves in, making it possible to safely, economically and profitably collect all of the coal of the pillars.

The gathering conveyer, as herein described, comprises an endless reversible transmission belt carrying spaced flights or arms extending in a horizontal direction at right angles to the belt's forward and return runs or portions. From one transmission wheel to the second over which the belt is looped, the arms in the longitudinal runs of the belt traverse over the stationary, non-traveling ways or planes, which provide two conveyer courses alternately available as forward and return, according to the direction of belt motion. The belt motion is controllable so that the flights or arms swing in a direction about the axis of the belt transmission wheel at the nose or gathering end of the conveyer for appropriately attacking the mass, or corresponding to the direction of the lateral sweeping feed or motion of the conveyer, for an inward scraping action, moving the coal directly upon one of the elevating planes. The flights convey both slack and lump sizes of coal with which it comes in contact and lumps of sizes which could not be manually handled. This is of a decided advantage, increasing the market value of the coal. The reversibility of the transmission belt is also of advantage to prevent or release conveyer choking conditions. The discharge ends of the planes terminate abruptly so that the flights or arms are free from the planes approximately for the arc of swing about the axis of the transmission belt at the discharge end of the conveyer, providing an unimpeded discharge of the material into the hopper disposed immediately beneath the discharge end of the gathering conveyer. The hopper bears a relation to the vertical axis of the gathering conveyer and has a mouth capacity, so that the discharge ends of the planes of the gathering conveyer will always be in a position to receive the conveyed material irrespective of the working angularity of the gathering conveyer. The hopper is open in the line of draft of the delivering conveyer, the delivering conveyer leading out of and providing the base of the hopper.

The hopper walls are inclined or flared to centralize the coal upon the delivery conveyer. This conveyer is of a single run or plane type for conveying and elevating the coal above the height of the coal car which is stationed beneath the discharging end of the delivering conveyer. The delivering conveyer discharges the coal centrally into the car, so that the car can be filled to a heaping capacity from end to end. The car is initially disposed beneath the end of the conveyor approximately its full length and gradually advanced as it is being filled end to end.

The conveyer flights move about horizontal axes respectively at the opposite ends of the belt transmission, as distinguished from the flight travel of the gathering conveyer, to provide for a discharge in the draft line of the conveyers so that the coal cannot be thrown off of the car by the flights.

What I claim, is:

1. In a loading machine of the character described the combination with a front truck and a rear truck adapted to travel upon and be guided by a mine car track and capable of moving to varying positions of horizontal angularity with respect to each other, of a gathering conveyer mounted on the front truck to have a bodily horizontal swinging movement about a vertical axis adjacent the rear end of said truck, said gathering conveyer comprising a pan and flights mounted to travel with respect to said pan to convey material thereover and which flights sweep horizontally and laterally across the front of said pan and horizontally and laterally through the material being gathered, a hopper located at the front of the rear truck and a discharging conveyer leading out of said hopper, the vertical axis of said gathering conveyer and said hopper being so located with respect to each other upon their separate trucks that when the two trucks are brought into working position one in the rear of the other the hopper will be in position to directly receive material discharged from the rear end of the gathering conveyer throughout all positions of angularity of the gathering conveyer with respect to the front truck and throughout all positions of angularity of the two trucks with respect to each other and all positions of angularity of the two conveyers with respect to each other.

2. In a loading machine of the character described the combination with a front truck and a rear truck adapted to travel upon and be guided by a mine car track and capable of moving to varying positions of horizontal angularity with respect to each other, of a gathering conveyer comprising a pan including an inclined portion and a depressed substantially horizontal front end portion which merges into the inclined portion, means for mounting said pan on the front truck to have a bodily horizontal swinging movement about a vertical axis adjacent the rear end of said track whereby the front end of the pan is caused to have a horizontal swinging movement back and forth over the surface from which material is being gathered, an endless chain carrying transverse flights movable over the surface of said pan and guided at the front end of said pan about a substantially vertical axis, whereby said flights are caused to sweep horizontally and laterally through the material being gathered, a hopper located at the front of the rear truck and a discharging conveyer, leading out of said hopper, the vertical axis of said gathering conveyer pan and said hopper being so located with respect to each other upon their separate trucks that when the two trucks are brought into working position one in the rear of the other the hopper will be in position to directly receive material discharged from the rear end of the gathering conveyer throughout all positions of angularity of the gathering conveyer with respect to the front truck and throughout all positions of angularity of the two trucks with respect to each other and all positions of angularity of the two conveyers with respect to each other.

3. A structure as recited in claim 1 wherein the gathering conveyer is also mounted for bodily swinging movement about a horizontal axis.

4. In a loading machine of the character described, a gathering conveyer comprising traveling flights operable in both directions and a pan associated therewith comprising slides for conveying the material when the flights are run in either direction, a front truck, means for pivotally mounting the gathering conveyer upon the front truck to adapt its front end to swing horizontally back and forth across a mine floor and, in conjunction with the flights to gather material in both directions, a rear truck, said trucks being adapted to travel upon and be guided by a mine car track and being capable of movement to varying positions of angularity with respect to each other, a hopper located at the front of the rear truck, and beneath the discharging end of the gathering conveyer, and a discharging conveyer leading out of said hopper the point of pivotal mounting of the gathering conveyer and said hopper being so located with respect to each other upon their separate trucks that when the two trucks are brought into working position one in the rear of the other the hopper will be in position to directly receive material discharged from the rear end of the gathering conveyer throughout all positions of angularity of the gathering conveyer with respect to the front truck and throughout all positions of angularity of the two trucks with respect to each other and all positions of angularity of the two conveyers with respect to each other.

5. In a coal loading machine, a gathering conveyer including a pan whose going and return sections are at the same elevation, a truck, a member pivotally supported on said truck to swing about a horizontal axis, said member being provided with a vertically extended bearing portion, a head shaft passing through said bearing portion and into said pan, a sprocket on said head shaft located in said pan, and means for rotatably supporting the rear portion of said conveyer pan on said member to swing about a vertical pivot.

6. In a coal loading machine, a gathering conveyer including a pan whose going and return sections are at the same elevation, a truck, a member pivotally supported on said truck to swing about a horizontal axis, said member being provided with a vertically extending bearing portion, a head shaft passing through said bearing portion and into said pan, a sprocket on said head shaft located in said pan, and means for rotatably supporting the rear portion of said conveyer pan on said member to swing about a vertical pivot, and additional releasable means for preventing said member moving rearwardly about its horizontal pivot.

7. In a coal loading machine, a gathering conveyer including a pan whose going and return sections are at the same elevation, a truck, a member pivotally supported on said truck to swing about a horizontal axis, said member being provided with a vertically extending bearing portion, a head shaft passing through said bearing portion, a sprocket on said head shaft, said conveyer pan being adapted to swing about said shaft as a center, and means carried by said member at a distance from said shaft for preventing relative separation between said member and said pan when said member is swung rearwardly about its horizontal axis and at the same time permitting swinging about its vertical axis.

8. A coal loading machine comprising a gathering conveyer, a truck, a member pivotally supported on said truck to swing about a horizontal axis, said member being provided with an upwardly extending neck portion, means for rotatably supporting the rear portion of said conveyer about the upwardly extending neck portion, and releasable means operatively engaging the rear portion of said conveyer and also said truck to prevent swinging of said conveyer about its horizontal pivot.

9. In a coal loading machine, a pair of separate trucks, a gathering conveyer mounted on one of said trucks, a discharging conveyer capable of a pivotal movement about a horizontal axis mounted on the other truck, and a hopper arranged to be located beneath the discharge end of said gathering conveyer and carried by said second named truck out of which said discharging conveyer operates, said hopper being formed of relatively movable sections to permit the adjustment of said discharging conveyer about its horizontal axis without materially destroying the relationship between the hopper and the discharge end of the gathering conveyer.

10. In a loading machine of the character described, a gathering conveyer whose going and return sections are at the same elevation, a wheeled supporting truck, means for supporting the rear end of said conveyer thereon to enable it to swing about a vertical axis, and means for in turn supporting said first named means from said truck at a position in a substantially vertical transverse plane passing through the rear wheel center of said truck to permit up and down movement of the front end of said conveyer.

11. In a transportable loading machine, a gathering and elevating conveyer comprising non-traveling belt run-ways and a reversible transmission belt having spaced flights traveling over said run-ways for conveying material upon a run-way in a forward run of said belt, a flaring walled hopper beneath the rear ends of said belt run-ways, a delivering conveyer leading out of the base of said hopper comprising a non-traveling way, the forward end providing the base of the hopper, and belt means having spaced flights traveling over said way with the forward run of said belt means, means for pivotally mounting the rear end of said gathering conveyer, adapting the front end of the conveyer to be swung horizontally, the swinging axis of said gathering conveyer and said hopper being so located with respect to each other, whereby the hopper will be in a position to directly receive the material discharged from the rear end of the run-ways in the positions of angularity of the gathering conveyer and in the positions of angularity of the two conveyers with respect to each other.

12. In a transportable loading machine, a gathering and elevating conveyer comprising non-traveling conveyer flight planes at the opposite runs of a belt, and a reversible transmission belt having spaced flights traveling over said planes, the belt being reversible for alternately conveying the material on either of said planes in an advancing draft direction, a hopper beneath the discharging ends of said planes for centralizing the discharge from said planes, said hopper being open in the line of draft, a delivery conveyer leading out of and providing the base of said hopper comprising a non-traveling plane, the forward end providing the base of the hopper, and belt transmission means having spaced flights traveling over said plane on the forward run of the belt means, means for pivotally mounting the rear end of said gathering conveyer, adapting the front end of the conveyer to be swung horizontally, the swinging axis of said gathering conveyer and said hopper being so located with respect to each other, whereby the hopper will be in a position to unobstructingly receive the material discharged from the planes within the angular adjusting capacity of the gathering conveyer and irrespective of the angularity of the two conveyers.

13. In a machine of the character described, a gathering and elevating conveyer having its discharging end elevated and swinging upon a vertical axis for angular adjustment to horizontally sweep the receiving end across the floor upon which the material is gathered, and comprising duplex ways and a reversible transmission belt carrying spaced flights the flights traversing the ways alternately in the forward and return portions of said belt, and in a horizontal arc from one way to the second at the opposite ends of the conveyer, the ways terminating at their discharge end to provide a non-conveyer flight sweep from one way to the second, a hopper disposed beneath the discharge end of said gathering conveyer to directly receive the material from said gathering conveyer irrespective of its positions of angularity and open to the line of draft of the material, a delivering conveyer having a way leading out of and providing a base for said hopper, endless transmission means carrying spaced flights traversing said way and about a horizontal axis at each of the opposite ends of said way, the discharge end of said conveyer being elevated to receive a car therebeneath into which the conveyer is adapted to centrally discharge, and mobile means for supporting and transporting said conveyers and hopper as a unit, in feeding and transit capacities.

14. In a machine of the character described, a gathering and elevating conveyer, comprising a reversible transmission belt having spaced arm flights extending horizontally from the belt, flight run-ways upon which the material is conveyed by the flights, the reversibility of the belt rendering said ways alternately available for conveying the material in a common draft direction, said ways at their discharge ends terminating to provide a non-conveying arm arc sweep from one way to the second, said conveyer pivotally mounted at its discharging end for swinging the conveyer horizontally, a hopper disposed beneath the discharge end of said gathering conveyer open in a draft line, a delivering conveyer leading out of and providing the base of said hopper, the hopper directing the material therein upon said delivering conveyer, said delivering conveyer comprised of a single flight way and endless transmission means, having spaced flights traveling over said way and about a horizontal axis at each of the opposite ends of said ways, and means for transporting the conveyer and hopper as a unit.

15. In a machine of the nature described, a gathering and elevating conveyer, having ways and reversible traveling conveyer flights traversing said ways and sweeping in a horizontal arc at the opposite ends of the ways, the ways at their discharge end terminating to provide for a free flight sweep from one way to the second, a hopper disposed beneath the discharge end of said conveyer open in the line of draft, and a delivering conveyer comprising a draft line way and traveling conveyer flights traversing said ways and horizontally about the opposite ends thereof, said ways leading out of and providing the base of the hopper.

16. In a machine of the nature described, a gathering and elevating conveyer, having ways and reversible traveling conveyer flights traversing said ways and sweeping in a horizontal arc at the opposite ends of the ways, the ways at their discharge end terminating to provide for a free flight sweep from one way to the second, a hopper disposed beneath the discharge end of said conveyer open in the line of draft, a delivering conveyer comprising a draft line way and traveling conveyer flights traversing said ways and horizontally about the opposite ends thereof, said ways leading out of and providing the base of the hopper, and mobile means for supporting and transporting said conveyer and hopper as a unit.

In testimony whereof I affix my signature.

NORTON A. NEWDICK.